United States Patent
Hisaoka et al.

(10) Patent No.: US 12,240,934 B2
(45) Date of Patent: Mar. 4, 2025

(54) METHOD FOR PRODUCING HYDROCARBON RESIN HYDRIDE

(71) Applicant: ZEON CORPORATION, Tokyo (JP)

(72) Inventors: Yasushi Hisaoka, Tokyo (JP);
Yoshifumi Maruyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 635 days.

(21) Appl. No.: 17/597,155

(22) PCT Filed: Jun. 22, 2020

(86) PCT No.: PCT/JP2020/024339
§ 371 (c)(1),
(2) Date: Dec. 28, 2021

(87) PCT Pub. No.: WO2021/002230
PCT Pub. Date: Jan. 7, 2021

(65) Prior Publication Data
US 2022/0306775 A1    Sep. 29, 2022

(30) Foreign Application Priority Data

Jul. 4, 2019 (JP) .................................. 2019-125211

(51) Int. Cl.
| | |
|---|---|
| *C08F 8/04* | (2006.01) |
| *B01J 21/14* | (2006.01) |
| *B01J 23/755* | (2006.01) |
| *B01J 35/40* | (2024.01) |
| *C08K 5/134* | (2006.01) |
| *C08K 5/3435* | (2006.01) |
| *C08K 5/3492* | (2006.01) |

(52) U.S. Cl.
CPC ................ *C08F 8/04* (2013.01); *B01J 21/14* (2013.01); *B01J 23/755* (2013.01); *B01J 35/40* (2024.01); *C08K 5/1345* (2013.01); *C08K 5/3435* (2013.01); *C08K 5/3492* (2013.01)

(58) Field of Classification Search
CPC ...... C08F 8/04; C08F 236/10; C08F 236/045; C08F 232/04; C08F 210/10; C08F 212/08; B01J 21/14; B01J 23/755; B01J 35/40; C08K 5/1345; C08K 5/3435; C08K 5/3492; C08K 5/34926; C08L 45/00

See application file for complete search history.

(56) References Cited

U.S. PATENT DOCUMENTS

| | | | | |
|---|---|---|---|---|
| 4,853,440 A | * | 8/1989 | Roggero | .............. C08C 19/02 |
| | | | | 525/333.1 |
| 4,961,838 A | * | 10/1990 | Llovera | .............. C10G 25/003 |
| | | | | 208/143 |
| 5,491,214 A | | 2/1996 | Daughenbaugh et al. | |
| 5,817,900 A | | 10/1998 | Berrevoets et al. | |
| 2019/0100612 A1 | * | 4/2019 | Kameyama | .............. C09J 7/35 |

FOREIGN PATENT DOCUMENTS

| | | |
|---|---|---|
| JP | S61204210 A | 9/1986 |
| JP | S633060 A | 1/1988 |
| JP | S63141638 A | 6/1988 |
| JP | H0256238 A | 2/1990 |
| JP | H04372606 A | 12/1992 |
| JP | H05276269 A | 10/1993 |
| JP | H09268209 A | 10/1997 |
| JP | 3971468 B2 | 9/2007 |
| JP | 3987587 B2 | 10/2007 |
| JP | 2019065127 A | 4/2019 |
| JP | 2019065128 A | 4/2019 |
| WO | WO-2017171025 A1 * 10/2017 ............. C08C 19/02 |

OTHER PUBLICATIONS

Product specification sheet (Year: NA).*
Sep. 1, 2020, International Search Report issued in the International Patent Application No. PCT/JP2020/024339.
Dec. 28, 2021, International Preliminary Report on Patentability issued in the International Patent Application No. PCT/JP2020/024339.
Jul. 7, 2023, the Extended European Search Report issued by the European Patent Office in the corresponding European Patent Application No. 20835163.5.

* cited by examiner

*Primary Examiner* — Doris L Lee
(74) *Attorney, Agent, or Firm* — KENJA IP LAW PC

(57) ABSTRACT

Provided is a method for producing a hydrocarbon resin hydride, comprising: hydrogenating a hydrocarbon resin by bringing the hydrocarbon resin into contact with hydrogen in the presence of an antioxidative compound and a hydrogenation catalyst, the antioxidative compound being at least one selected from the group consisting of hindered phenolic antioxidants and antioxidants having a 2,2,6,6-tetraalkyl-4-piperidyl group.

9 Claims, No Drawings

METHOD FOR PRODUCING HYDROCARBON RESIN HYDRIDE

TECHNICAL FIELD

The present invention relates to a method for producing a hydrocarbon resin hydride, the method enabling production of a hydrocarbon resin hydride having an excellent hue and a low odor while suppressing changes in molecular weight and softening point caused by hydrogenation of a hydrocarbon resin.

BACKGROUND ART

Hydrocarbon resins having carbon-carbon double bonds are known, for example, hydrocarbon resins prepared by copolymerizing a monoolefinically unsaturated hydrocarbon and a chain conjugated diolefin. Such hydrocarbon resins are used as tackifying resins for forming hot-melt adhesives, for example.

On the other hand, to improve the hue or the like of hot-melt adhesives, it has been attempted to use hydrogenated hydrocarbon resins as tackifying hydrocarbon resins. For example, Patent Documents 1 and 2 disclose a technique of hydrogenating color bodies of a hydrocarbon resin to lighten the color of the hydrocarbon resin while changes in physical properties such as molecular weight and softening point are suppressed.

In such a technique disclosed in Patent Documents 1 and 2, only the color bodies easy to hydrogenate are selectively hydrogenated, and the carbon-carbon double bonds present in the skeleton of the hydrocarbon resin are not hydrogenated. Although the technique according to Patent Documents 1 and 2 improves the hue to some extent, the presence of a large number of carbon-carbon double bonds in hydrocarbon resins has created a demand for a technique which can further suppress changes in physical properties such as molecular weight and softening point.

RELATED ART

Patent Documents

Patent Document 1: JP 3971468
Patent Document 2: JP 3987587

SUMMARY OF THE INVENTION

Problem to be Solved by the Invention

The present invention has been made in consideration of such circumstances. An object of the present invention is to provide a method for producing a hydrocarbon resin hydride, the method enabling production of a hydrocarbon resin hydride having an excellent hue and a low odor while suppressing changes in molecular weight and softening point caused by hydrogenation of a hydrocarbon resin.

Means for Solving Problems

The present inventors, who have conducted extensive research to achieve the above object, have found that by bringing a hydrocarbon resin into contact with hydrogen in the presence of an antioxidative compound and a hydrogenation catalyst, the antioxidative compound being at least one selected from the group consisting of hindered phenolic antioxidants and antioxidants having a 2,2,6,6-tetraalkyl-4-piperidyl group, a hydrocarbon resin hydride having an excellent hue and a low odor can be produced while changes in molecular weight and softening point due to the hydrogenation of the hydrocarbon resin are suppressed, and have completed the present invention.

In other words, the present invention provides a method for producing a hydrocarbon resin hydride, comprising hydrogenating a hydrocarbon resin by bringing the hydrocarbon resin into contact with hydrogen in the presence of an antioxidative compound and a hydrogenation catalyst, the antioxidative compound being at least one selected from the group consisting of hindered phenolic antioxidants and antioxidants having a 2,2,6,6-tetraalkyl-4-piperidyl group.

In the production method according to the present invention, the amount of the antioxidative compound is preferably 0.01 to 10 parts by mass relative to 100 parts by mass of the hydrocarbon resin.

In the production method according to the present invention, the hydrocarbon resin is preferably prepared through a stripping treatment on a polymer solution containing the hydrocarbon resin, the polymer solution being prepared by cationic polymerization in the presence of a Lewis acid catalyst.

In the production method according to the present invention, preferably, the hydrogenating is performed by bringing the hydrocarbon resin into contact with hydrogen while the hydrocarbon resin is heated to 150 to 350° C. and is controlled to maintain a melt viscosity in the range of 50 to 1500 mPa·s.

In the production method according to the present invention, the hydrogenating is preferably performed at a hydrogen pressure controlled in the range of 0.5 to 3.0 MPa.

In the production method according to the present invention, the hydrogenating is preferably performed by bringing the hydrocarbon resin into contact with hydrogen using a fixed bed reactor.

In the production method according to the present invention, the hydrogenation catalyst is preferably in a granular foam having an average diameter of 1 to 5 mm(1) and an average length of 1 to 10 mm.

In the production method according to the present invention, the hydrogenation catalyst is preferably a nickel catalyst.

In the production method according to the present invention, the nickel catalyst is preferably a catalyst mainly composed of magnesia-silica bearing nickel.

Effects of Invention

The present invention can provide a method for producing a hydrocarbon resin hydride, the method enabling production of a hydrocarbon resin hydride having an excellent hue and a low odor while suppressing changes in molecular weight and softening point caused by hydrogenation of the hydrocarbon resin.

DESCRIPTION OF EMBODIMENTS

The method for producing a hydrocarbon resin hydride according to the present invention comprises hydrogenating a hydrocarbon resin by bringing the hydrocarbon resin into contact with hydrogen in the presence of an antioxidative compound and a hydrogenation catalyst, the antioxidative compound being at least one selected from the group consisting of hindered phenolic antioxidants and antioxidants having a 2,2,6,6-tetraalkyl-4-piperidyl group.

<Antioxidative Compound>

The antioxidative compound used in the present invention may be at least one selected from the group consisting of hindered phenolic antioxidants and antioxidants having a 2,2,6,6-tetraalkyl-4-piperidyl group. Only any one of a hindered phenolic antioxidant and an antioxidant having a 2,2,6,6-tetraalkyl-4-piperidyl group may be used, or a combination thereof may be used. The amount of the antioxidative compound is preferably 0.01 to 10 parts by mass, more preferably 0.05 to 5 parts by mass, still more preferably 0.05 to 2 parts by mass, most preferably 0.05 to 0.5 parts by mass relative to 100 parts by mass of the hydrocarbon resin. By controlling the amount of the antioxidative compound within such a range, changes in molecular weight and softening point caused by the hydrogenation can be further suppressed. When the hindered phenolic antioxidant and the antioxidant having a 2,2,6,6-tetraalkyl-4-piperidyl group are used in combination, for the amount ratio of these antioxidative compounds, it is preferred that the weight ratio "hindered phenolic antioxidant:antioxidant having a 2,2,6, 6-tetraalkyl-4-piperidyl group" be 10:90 to 90:10.

<Hindered Phenolic Antioxidant>

The hindered phenolic antioxidant is preferably an antioxidant including at least one hindered group at the 2- or 6-position with respect to the hydroxyl group. Here, the hindered group indicates a sterically hindered substituent, and is a substituent having 3 or more carbon atoms. Suitable examples thereof include tertiary hydrocarbon groups such as a t-butyl group. In contrast, examples of unhindered groups include a hydrogen atom, linear hydrocarbon groups having 2 or less carbon atoms such as a methyl group and an ethyl group, and the like.

Examples of the hindered phenolic antioxidant include, but should not be limited to, pentaerythritol tetrakis[3-(3,5-di-t-butyl-4-hydroxyphenyl) propionate], octadecyl-3-(3,5-di-t-butyl-4-hydroxyphenyl)propionate, 2,6-di-t-butyl-p-cresol, di-t-butyl-4-methylphenol, and the like. Among these, preferred are pentaerythritol tetrakis[3-(3,5-di-t-butyl-4-hydroxyphenyl)propionate] and 2,6-di-t-butyl-p-cresol, and particularly preferred is pentaerythritol tetrakis [3-(3,5-di-t-butyl-4-hydroxyphenyl)propionate]. These hindered phenolic antioxidants may be used alone or in combination.

<Antioxidant Having 2,2,6,6-Tetraalkyl-4-Piperidyl Group>

The 2,2,6,6-tetraalkyl-4-piperidyl group included in the antioxidant having a 2,2,6,6-tetraalkyl-4-piperidyl group indicates a group represented by the general formula:

[Chem. 1]

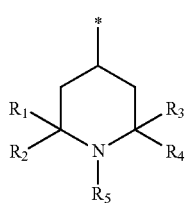

In the formula, $R_1$ to $R_4$ represent any alkyl group, and are preferably a $C_1$ to $C_4$ alkyl group; $R_5$ is hydrogen or a $C_1$ to $C_8$ alkyl or alkoxy group which may have a substituent; and * represents a bond. $R_1$ to $R_4$ may be the same or different. Specific examples thereof include a methyl group, an ethyl group, a propyl group, a butyl group, a hexyl group, an octyl group, and the like. Preferred are a methyl group, an ethyl group, a propyl group, and a butyl group. Specific examples of $R_5$ include hydrogen, a methyl group, an octyl group, and the like. Hydrogen is preferred.

The antioxidant having a 2,2,6,6-tetraalkyl-4-piperidyl group may be a commercially available product. Specific examples of such a commercially available antioxidant having a 2,2,6,6-tetraalkyl-4-piperidyl group include poly [{6-(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}] (trade name "Chimassorb (registered trademark) 944"), an N,N'-bis(3-aminopropyl)ethylenediamine-2,4-bis[N-butyl-N-(1,2,2,6, 6-pentamethyl-4-piperidyl)amino]-6-chloro-1,3,5-triazine condensate (trade name "Chimassorb (registered trademark) 119"), poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}] (trade name "Chimassorb (registered trademark) 2020") (all available from BASF Japan Ltd.), and the like. Among these, particularly preferred is poly[{(1,1,3,3-tetramethylbutyl) amino-1,3,5-triazine-2,4-diyl}{(2,2,6,6-tetramethyl-4-piperidyl)imino} hexamethylene{(2,2,6,6-tetramethyl-4-piperidyl)imino}] (trade name "Chimassorb (registered trademark) 2020"). These antioxidants having a 2,2,6,6-tetraalkyl-4-piperidyl group may be used alone or in combination.

<Hydrogenation Catalyst>

Any hydrogenation catalyst can be used in the present invention without limitation, and a nickel catalyst is preferred. In particular, from the viewpoint of high reactivity, preferred is a catalyst mainly composed of an inorganic carrier compound as a carrier and nickel as a metal on the inorganic carrier compound. Specific examples of the inorganic carrier compound as a carrier include silica, alumina, boria, silica-alumina, diatomite, white clay, clay, magnesia, magnesia-silica (silica-magnesium oxide), titania, zirconia, and the like. Among these, preferred is magnesia-silica from the viewpoint of reactivity.

The hydrogenation catalyst can have any form. From the viewpoint of reactivity, granular forms are preferred, and a variety of forms such as pellet forms, spherical forms, and cylindrical forms can be used, for example. To further enhance the reactivity, the average diameter is preferably 1 to 5 mmϕ, more preferably 1 to 4 mmϕ, still more preferably 1 to 3 mmϕ, and the average length is preferably 1 to 10 mm, more preferably 1 to 8 mm, still more preferably 1 to 4 mm.

<Hydrogenation>

In the present invention, the hydrocarbon resin is hydrogenated by bringing the hydrocarbon resin into contact with hydrogen in the presence of the antioxidative compound and the hydrogenation catalyst, the antioxidative compound being at least one selected from the group consisting of hindered phenolic antioxidants and antioxidants having a 2,2,6,6-tetraalkyl-4-piperidyl group. In the production method according to the present invention, a hydrocarbon resin hydride having an excellent hue and a low odor can be produced by hydrogenating the hydrocarbon resin, and changes in molecular weight and softening point caused by the hydrogenation of the hydrocarbon resin can be suppressed by using the antioxidative compound in the hydrogenation. Furthermore, the production method according to the present invention enables production of a hydrocarbon resin hydride having a small value of the Gardner color scale and high heat resistance even if heating is performed at 200° C. for 3 hours.

The hydrocarbon resin can be in any state during the hydrogenation. The hydrocarbon resin may be dissolved in an organic solvent, may be in a solid state, or may be in a melted state.

The organic solvent for dissolving the hydrocarbon resin may be any organic solvent inactive to the hydrogenation catalyst, and is not particularly limited. From the viewpoint of solubility, a hydrocarbon solvent is preferably used. Examples of the hydrocarbon solvent include aromatic hydrocarbons such as benzene and toluene; aliphatic hydrocarbons such as n-pentane and hexane; alicyclic hydrocarbons such as cyclohexane and decalin; and the like. Among these, preferred are cyclic compounds such as aromatic hydrocarbons and alicyclic hydrocarbons. These organic solvents may be used alone or in combination.

The hydrocarbon resin can be brought into contact with hydrogen in the presence of the antioxidative compound and the hydrogenation catalyst by any method. Examples thereof include a batch treatment method of placing the hydrocarbon resin, the antioxidative compound, and the hydrogenation catalyst together in a vessel appropriately selected, and bringing the hydrocarbon resin into contact with hydrogen optionally with stirring; a continuous treatment method of bringing the hydrocarbon resin into contact with hydrogen while passing the hydrocarbon resin and the antioxidative compound through a fixed bed reactor to which the hydrogenation catalyst is fixed.

In the production method according to the present invention, a method of bringing the hydrocarbon resin in a solid or melted form into direct contact with hydrogen is preferably used because a hydrocarbon resin hydride having a target hydrogenation ratio can be obtained more stably and efficiently. In particular, more preferred is a continuous treatment method of bringing the solid or melted hydrocarbon resin into contact with hydrogen while passing the hydrocarbon resin through a fixed bed reactor to which the hydrogenation catalyst is fixed. Preferably, the solid or melted hydrocarbon resin does not substantially contain a volatile solvent.

Although not particularly limited, from the viewpoint of reaction efficiency, the fixed bed reactor to be suitably used can be a heat exchange-type multitube hydrogenation reactor. The heat exchange-type multitube hydrogenation reactor is an apparatus which includes a plurality of reaction tubes filled with the hydrogenation catalyst, and permits hydrogenation to continue by passing hydrogen gas and a polymer to be hydrogenated through the reaction tubes while heating the exteriors of the reaction tubes with a heating medium. For example, those disclosed in JPH05-276269A, JPS63-141638A, JPH02-56238A, and the like can be used. Each reaction tube of the heat exchange-type multitube hydrogenation reactor has an inner diameter of preferably 6 to 100 mm, more preferably 10 to 70 mm, and has a length of preferably 0.1 to 10 m, more preferably 0.3 to 7 m.

In the production method according to the present invention, especially, it is more preferred that the hydrogenation be performed while the hydrocarbon resin is heated to preferably 150 to 350° C., more preferably 150 to 300° C., still more preferably 160 to 275° C., particularly preferably 170 to 250° C. and is controlled to maintain a melt viscosity in the range of preferably 50 to 1500 mPa·s, more preferably 50 to 1000 mPa·s, still more preferably 75 to 800 mPa·s, particularly preferably 100 to 600 mPa·s.

A hydrocarbon resin hydride having a target hydrogenation ratio can be appropriately obtained by adjusting the temperature and the melt viscosity of the hydrocarbon resin within the ranges above during the hydrogenation, for example, even if in the hydrogenation using a fixed bed reactor, the number of passings of the hydrocarbon resin through the fixed bed reactor is one time (for example, the residence time in the fixed bed reactor is preferably 0.15 to 1.8 hours, more preferably 0.2 to 1.5 hours). Furthermore, by appropriately adjusting the temperature and the melt viscosity of the hydrocarbon resin within the ranges above, wetting of the hydrocarbon resin to the catalyst and controllability of the solubility of hydrogen to the hydrocarbon resin, which are needed in the hydrogenation, can be increased to enable adjustment to a target hydrogenation ratio. Thereby, a hydrocarbon resin hydride having a target hydrogenation ratio can be stably and more efficiently obtained even with one-time passing of the hydrocarbon resin through the fixed bed reactor. As a result, a hydrocarbon resin hydride having an excellent hue and a low odor can be appropriately obtained. In the present invention, although the one-time passing is preferred from the viewpoint of productivity, multi-time passing is also preferred as long as it satisfies the condition that the total residence time in the fixed bed reactor is substantially equal to that for the one-time passing (namely, the total residence time is 0.3 to 1.8 hours in the multi-time passing). In this case, the same effect as above can also be ensured.

Furthermore, because the hydrocarbon resin is hydrogenated in the presence of the antioxidative compound in the production method according to the present invention, changes in molecular weight and softening point caused by the hydrogenation of the hydrocarbon resin can be suppressed and a hydrocarbon resin hydride having an excellent hue and a low odor can be produced even if the hydrocarbon resin is heated to a high temperature and the melted hydrocarbon resin is hydrogenated.

Examples of the method of adjusting the temperature of the hydrocarbon resin during the hydrogenation include a method of preliminarily heating the hydrocarbon resin to be introduced to the fixed bed reactor, a method of heating the hydrocarbon resin inside the fixed bed reactor, and the like. Use of both of these heating methods is desired to appropriately obtain a hydrocarbon resin hydride having the target hydrogenation ratio. The melt viscosity of the hydrocarbon resin is measured with a Thermosel-type Brookfield viscometer using a #31 rotor.

For the hydrogen pressure during the hydrogenation, the absolute pressure is preferably in the range of 0.5 to 3.0 MPa, more preferably 0.8 to 2.5 MPa, still more preferably 1.0 to 2.0 MPa. A significantly low hydrogen pressure during the hydrogenation may result in a significantly low hydrogenation ratio, and thus result in a hydrocarbon resin hydride having a reduced hue. In contrast, a significantly high hydrogen pressure may also cause hydrocracking at the same time, and thus may result in a hydrocarbon resin hydride having an increased odor or reduce the selectivity of the hydrogenation reaction to obstruct achievement of the target quality.

Furthermore, the hydrocarbon resin hydride may be subjected to a treatment to remove low molecular weight oligomer components by steam distillation or the like. The heating condition at that time is preferably 160 to 350° C., more preferably 180 to 320° C.

Moreover, separately from the antioxidative compound added before hydrogenation, the hydrocarbon resin hydride prepared by the production method according to the present invention may be compounded with an additional antioxidant as needed.

<Hydrocarbon Resin>

Next, the hydrocarbon resin before hydrogenation used in the present invention will be described. The hydrocarbon resin used in the present invention can be any hydrocarbon resin prepared by polymerizing a monomer mixture containing an unsaturated hydrocarbon, and is not particularly limited.

The monomer mixture used to prepare the hydrocarbon resin can be any monomer mixture which contains at least an unsaturated hydrocarbon, and is not particularly limited. Preferred is a monomer mixture containing at least an aliphatic monoolefin and a conjugated diene.

Examples of the aliphatic monoolefin include $C_4$ to $C_6$ alicyclic monoolefins and $C_4$ to $C_8$ acyclic monoolefins.

The $C_4$ to $C_6$ alicyclic monoolefins are $C_4$ to $C_6$ hydrocarbon compounds having a molecular structure including one ethylenically unsaturated bond and a non-aromatic ring structure. Specific examples of the $C_4$ to $C_6$ alicyclic monoolefins include cyclobutene, cyclopentene, cyclohexene, methylcyclobutene, methylcyclopentene, and the like.

The content of $C_4$ to $C_6$ alicyclic monoolefin monomer units in the hydrocarbon resin used in the present invention is preferably 5 to 35% by mass, more preferably 10 to 33% by mass, still more preferably 15 to 32% by mass. By controlling the content of $C_4$ to $C_6$ alicyclic monoolefin monomer units within the range above, the hydrocarbon resin hydride after hydrogenation can have a lower odor and higher heat resistance.

Although these $C_4$ to $C_6$ alicyclic monoolefins may be used alone or in combination, it is preferred that at least cyclopentene be contained, and it is more preferred that the proportion of cyclopentene be 50% by mass or more of the $C_4$ to $C_6$ alicyclic monoolefins.

The $C_4$ to $C_8$ acyclic monoolefins are $C_4$ to $C_8$ chain hydrocarbon compounds having a molecular structure including one ethylenically unsaturated bond without a ring structure. Specific examples of the $C_4$ to $C_8$ acyclic monoolefins include butenes such as 1-butene, 2-butene, and isobutylene (2-methylpropene); pentenes such as 1-pentene, 2-pentene, 2-methyl-1-butene, 3-methyl-1-butene, and 2-methyl-2-butene; hexenes such as 1-hexene, 2-hexene, and 2-methyl-1-pentene; heptenes such as 1-heptene, 2-heptene, and 2-methyl-1-hexene; octenes such as 1-octene, 2-octene, 2-methyl-1-heptene, and diisobutylene (2,4,4-trimethyl-1-pentene and 2,4,4-trimethyl-1-pentene); and the like.

The content of $C_4$ to $C_8$ acyclic monoolefin monomer units in the hydrocarbon resin used in the present invention is preferably 5 to 30% by mass, more preferably 6 to 28% by mass, still more preferably 7 to 26% by mass, particularly preferably 8 to 24% by mass. By controlling the content of the $C_4$ to $C_8$ acyclic monoolefin monomer units within the above range, the hydrocarbon resin hydride after hydrogenation can have a lower odor and higher heat resistance.

These $C_4$ to $C_8$ acyclic monoolefins may be used alone or in combination. Preferably, at least one selected from the group consisting of 2-methyl-2-butene, isobutylene, and diisobutylene is contained. More preferably, the proportion of the total amount of 2-methyl-2-butene, isobutylene, and diisobutylene in the total $C_4$ to $C_8$ acyclic monoolefins is 50% by mass or more.

Preferred conjugated dienes are $C_4$ to $C_6$ chain conjugated dienes. Specific examples thereof include 1,3-butadiene, isoprene, 1,3-pentadiene, 1,3-hexadiene, and the like.

The content of conjugated diene monomer units in the hydrocarbon resin used in the present invention is preferably 20 to 80% by mass, more preferably 25 to 75% by mass, still more preferably 30 to 70% by mass, particularly preferably 35 to 65% by mass. By controlling the content of the conjugated diene monomer units within the above range, the hydrocarbon resin hydride after hydrogenation can have a lower odor and higher heat resistance.

These conjugated dienes may be used alone or in combination. Preferably, at least 1,3-pentadiene is contained. More preferably, the proportion of 1,3-pentadiene in the conjugated diene is 50% by mass or more. The cis/trans isomer ratio of 1,3-pentadiene may be any ratio, and is not particularly limited.

The monomer mixture used to prepare the hydrocarbon resin may further contain an alicyclic diolefin and/or an aromatic monoolefin.

The alicyclic diolefin is a hydrocarbon compound having a molecular structure including two ethylenically unsaturated bonds and a non-aromatic ring structure. Specific examples of the alicyclic diolefin include cyclopentadiene, multimers of cyclopentadiene such as dicyclopentadiene, methyl cyclopentadiene, multimers of methyl cyclopentadiene, and the like.

The content of alicyclic diolefin monomer units in the hydrocarbon resin used in the present invention is preferably 1% by mass or less, more preferably 0.8% by mass or less, still more preferably 0.6% by mass or less, particularly preferably 0.4% by mass or less.

The aromatic monoolefin is an aromatic compound having a molecular structure including one ethylenically unsaturated bond. Specific examples of the aromatic monoolefin include styrene, α-methylstyrene, vinyltoluene, indene, coumarone, and the like.

The content of aromatic monoolefin monomer units in the hydrocarbon resin used in the present invention is preferably 40% by mass or less, more preferably 38% by mass or less, still more preferably 36% by mass or less, particularly preferably 34% by mass or less.

The monomer mixture used to prepare the hydrocarbon resin may further contain other monomers different from those listed above. Examples of such other monomers include acyclic diolefins such as 1,2-butadiene and 1,4-pentadiene; alicyclic monoolefins having 7 carbon atoms or more such as cycloheptene; acyclic monoolefins having 3 carbon atoms or less or 9 carbon atoms or more such as ethylene, propylene, and nonene; and the like. The content of other monomer units in the hydrocarbon resin used in the present invention is preferably 30% by mass or less, more preferably 25% by mass or less, still more preferably 20% by mass or less.

The hydrocarbon resin used in the present invention may be the one prepared by polymerizing the monomer mixture containing the unsaturated hydrocarbon described above, and is not particularly limited. To efficiently prepare the hydrocarbon resin, the hydrocarbon resin is preferably prepared by cationic polymerization of the monomer mixture containing the unsaturated hydrocarbon described above in the presence of a Lewis acid catalyst. Examples of the Lewis acid catalyst used for this include, but should not be limited to, Friedel-Crafts cationic polymerization catalysts, and the like.

Examples of the Friedel-Crafts cationic polymerization catalysts include, but should not be limited to, halides of aluminum, iron, tantalum, zirconium, tin, beryllium, boron, antimony, gallium, bismuth, molybdenum, and the like. Among these, suitable are aluminum halides such as aluminum chloride ($AlCl_3$) and aluminum bromide ($AlBr_3$). The amount of the Friedel-Crafts cationic polymerization catalyst to be added is preferably 0.05 to 10 parts by mass, more preferably 0.1 to 5 parts by mass relative to 100 parts by mass of the monomer mixture used in polymerization.

In polymerization of the monomer mixture containing the unsaturated hydrocarbon, use of the Friedel-Crafts cationic polymerization catalyst in combination with a halogenated hydrocarbon is preferred because much higher catalytic activity can be provided.

Specific examples of the halogenated hydrocarbon include halogenated hydrocarbons having a halogen atom bonded to a tertiary carbon atom, such as t-butyl chloride, t-butyl bromide, 2-chloro-2-methylbutane, and triphenylmethyl chloride; halogenated hydrocarbons having a halogen atom bonded to a carbon atom adjacent to a carbon-carbon unsaturated bond, such as benzyl chloride, benzyl bromide, (1-chloroethyl)benzene, allyl chloride, 3-chloro-1-propyne, 3-chloro-1-butene, 3-chloro-1-butyne, and cinnamic chloride; and the like. Among these, preferred are t-butyl chloride and benzyl chloride because of their good balance between catalytic activity and handling properties. These halogenated hydrocarbons may be used alone or in combination. For the amount of the halogenated hydrocarbon, the molar ratio thereof to the Friedel-Crafts cationic polymerization catalyst is in the range of preferably 0.05 to 50, more preferably 0.1 to 10.

When the polymerization reaction is performed, the order of adding the components such as the monomer mixture and the polymerization catalyst to a polymerization reactor is not particularly limited, and these may be added in any order. To favorably control the polymerization reaction to ensure a hydrocarbon resin hydride after hydrogenation having a more excellent hue, preferred is a method of adding the monomer mixture and part of the polymerization catalyst component to a polymerization reactor, and then adding the remaining polymerization catalyst to the polymerization reactor after the polymerization reaction is started.

When the monomer used to prepare the hydrocarbon resin includes the $C_4$ to $C_6$ alicyclic monoolefin, to prevent generation of a gel and thus ensure a hydrocarbon resin hydride after hydrogenation which has a more excellent hue, it is preferred that the Friedel-Crafts cationic polymerization catalyst and the $C_4$ to $C_6$ alicyclic monoolefin be initially mixed in the polymerization reaction.

For the amount of the $C_4$ to $C_6$ alicyclic monoolefin to be mixed with the Friedel-Crafts cationic polymerization catalyst, the mass ratio of "$C_4$ to $C_6$ alicyclic monoolefin: Friedel-Crafts cationic polymerization catalyst" is controlled within the range of preferably 5:1 to 120:1, more preferably 10:1 to 100:1, still more preferably 15:1 to 80:1 to more appropriately prevent generation of a gel while ensuring sufficient catalytic activity.

In mixing the Friedel-Crafts cationic polymerization catalyst with the $C_4$ to $C_6$ alicyclic monoolefin, the order of addition is not particularly limited. The Friedel-Crafts cationic polymerization catalyst may be added to the $C_4$ to $C_6$ alicyclic monoolefin, or vice versa. The mixing is usually accompanied by heat generation. Thus, an appropriate diluent can also be used. The diluent to be used can be a volatile solvent described later.

To more favorably control the polymerization reaction, it is preferred that the polymerization reaction be performed in the presence of the volatile solvent in the polymerization reaction system. Although any volatile solvent that does not inhibit the polymerization reaction can be used without limitation, a saturated aliphatic hydrocarbon or an aromatic hydrocarbon is suitable. Examples of the saturated aliphatic hydrocarbon include $C_5$ to $C_{10}$ chain saturated aliphatic hydrocarbons such as n-pentane, n-hexane, 2-methylpentane, 3-methylpentane, n-heptane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, and 2,2,4-trimethylpentane; $C_5$ to $C_{10}$ cyclic saturated aliphatic hydrocarbons such as cyclopentane, cyclohexane, cycloheptane, and cyclooctane; and the like. Examples of the aromatic hydrocarbon include $C_6$ to $C_{10}$ aromatic hydrocarbons such as benzene, toluene, and xylene; and the like. These volatile solvents may be used alone or in combination. Although not particularly limited, the amount of the volatile solvent to be used is preferably 10 to 1,000 parts by mass, more preferably 50 to 500 parts by mass relative to 100 parts by mass of the monomer mixture used in polymerization. To be noted, for example, a mixture of an addition-polymerizable component and a non-addition-polymerizable component, such as a mixture of cyclopentane and cyclopentene, which is derived from the C5 fraction, may be added to the polymerization reaction system, where the addition-polymerizable component serves as the component of the monomer mixture and the non-addition-polymerizable component serves as the solvent.

Although not particularly limited, the polymerization temperature for the polymerization reaction is preferably −20° C. to 100° C., more preferably 10° C. to 70° C. The polymerization reaction time may be appropriately selected, and is usually 10 minutes to 12 hours, preferably 30 minutes to 6 hours.

When a desired polymerization conversion ratio is attained, the polymerization reaction is terminated by adding a polymerization terminator such as methanol, a sodium hydroxide aqueous solution, or an ammonia aqueous solution to the polymerization reaction system. Thereby, a polymer solution containing the hydrocarbon resin can be prepared.

The resulting polymer solution containing the hydrocarbon resin may be optionally subjected to a treatment to remove catalyst residues insoluble to the volatile solvent by filtration or the like or an adsorbent contact treatment to bring these catalyst residues into contact with an adsorbent.

The adsorbent used in the adsorbent contact treatment can be any adsorbent without limitation, and may be a chemical adsorbent or may be a physical adsorbent. Specific examples of the chemical adsorbent include zinc adsorbents such as basic zinc carbonate, zinc oxide, zinc sulfate, zinc laurate, zinc stearate, and zinc myristate; zirconium adsorbents such as zirconium oxide, zirconium hydroxide, and zirconium phosphate; manganese adsorbents such as manganese dioxide; cobalt adsorbents such as cobalt chloride; copper adsorbents such as copper chloride and copper oxide; amine adsorbents such as polyamine compounds; and the like. Specific examples of the physical adsorbent include zeolite adsorbents collectively referred to as hydrous aluminosilicate minerals, such as aluminum sodium silicate, silicon dioxide, magnesium oxide, silica gel, silica alumina, aluminum silicate, activated alumina, acid clay, activated clay, dawsonite compounds, hydrotalcite compounds, and the like. These adsorbents may be used alone or in combination. Among these, from the viewpoint of a higher effect of reducing the odor, use of the chemical adsorbent is preferred, use of a zinc adsorbent is more preferred, and use of basic zinc carbonate is particularly preferred.

Examples of the method of bringing the resulting polymer solution containing the hydrocarbon resin into contact with the adsorbent in the adsorbent contact treatment include, but should not be limited to, a batch treatment method of placing the polymer solution and the adsorbent together in a vessel, and bringing the polymer solution containing the hydrocarbon resin into contact with the adsorbent by stirring as needed; a continuous treatment method of preliminarily charging the adsorbent into a packed column, and passing the polymer solution therethrough to bring the polymer solution containing the hydrocarbon resin into contact with the adsorbent, and the like.

Although not particularly limited, the amount of the adsorbent to be used when the polymer solution containing the hydrocarbon resin is brought into contact with the adsorbent by the batch treatment method is usually 0.01 to 5.0 parts by mass, preferably 0.03 to 3.0 parts by mass, more preferably 0.05 to 2.0 parts by mass relative to 100 parts by mass of the hydrocarbon resin contained in the polymer solution. Although not particularly limited, the temperature when the polymer solution is brought into contact with the adsorbent is usually selected in the range of 10° C. to 70° C. Although not particularly limited, the treatment time is usually selected in the range of 0.1 to 2 hours. If the polymer solution is brought into contact with the adsorbent by the batch treatment method, the adsorbent may be removed as needed.

Preferably, the polymer solution containing the hydrocarbon resin may be further subjected to a stripping treatment to remove volatile components such as the volatile solvent and unreacted monomers. In the production method according to the present invention, by preliminarily performing the stripping treatment, the hydrocarbon resin before hydrogenation is hydrogenated in the state where the volatile solvent and unreacted monomers are removed. Such an operation can effectively suppress a reduction in controllability of the hydrogenation ratio, which reduction is attributed to unreacted monomers unintentionally hydrogenated during the hydrogenation. In particular, in the case of preparing a hydrocarbon resin by cationic polymerization in the presence of the Lewis acid catalyst, a hydrocarbon resin having excellent various properties can be efficiently prepared while 10 to 20% of unreacted monomers is inevitably contained and is unintentionally hydrogenated. As a result, the controllability of the hydrogenation ratio may be reduced, for example, the hydrogenation ratio is varied, thus leading to difficulties in obtaining a desired hydrogenation ratio. If the hydrogenation is performed while the volatile solvent and unreacted monomers are removed by the stripping treatment, the controllability of the hydrogenation ratio can be enhanced, and thus a hydrocarbon resin hydride having a target hydrogenation ratio can be stably and efficiently prepared. As a result, a hydrocarbon resin hydride having a much more excellent hue and a much lower odor can be appropriately prepared.

As the stripping treatment, preferred is a method of removing volatile components such as the volatile solvent and unreacted monomers by heating the polymer solution containing the hydrocarbon resin to preferably 80 to 240° C., more preferably 100 to 200° C. under an inert gas atmosphere of argon gas or nitrogen gas as needed. If the inert gas is used in this treatment, the flow rate thereof is preferably 0.2 to 1.0 m$^2$/(hr·kg). The time for the stripping treatment is preferably 0.5 to 24 hours. If the polymer solution is passed through the packed column by the continuous method to be stripped, the residence time is 0.01 to 1 hour. After the volatile components are removed by heating, the hydrocarbon resin free from the volatile components may further be subjected to a treatment to remove low molecular weight oligomer components by steam distillation or the like. The heating condition at that time is preferably 160 to 350° C., more preferably 180 to 320° C.

The amount of impurities such as residual unreacted monomers and low molecular weight oligomers not removed from the hydrocarbon resin by the stripping treatment is preferably 1000 mass ppm or less. By controlling the amount of impurities within the above range, the controllability of the hydrogenation ratio during the hydrogenation can be suitably enhanced.

<Hydrocarbon Resin Hydride>

To ensure a hydrocarbon resin hydride having a more excellent hue and a lower odor, the hydrogenation ratio of the hydrocarbon resin hydride prepared by the production method according to the present invention (the proportion of hydrogenated non-aromatic carbon-carbon double bonds in the total non-aromatic carbon-carbon double bonds of the hydrocarbon resin before hydrogenation) is preferably 3 to 95%, more preferably 10 to 95%, still more preferably 20 to 90%, particularly preferably 30 to 80%. The hydrogenation ratio can be determined from the difference between the amount of non-aromatic carbon-carbon double bonds contained in the hydrocarbon resin before hydrogenation and that of non-aromatic carbon-carbon double bonds contained in the hydrocarbon resin hydride after hydrogenation. Here, the amount of non-aromatic carbon-carbon double bonds can be determined by $^1$H-NMR spectrum measurement. In the present invention, the hydrogenation of the hydrocarbon resin in the presence of the antioxidative compound can more effectively suppress changes in molecular weight and softening point caused by the hydrogenation thereof, compared to the case where the hydrogenation is performed in the absence of the antioxidative compound until the hydrogenation ratio reaches the same level. For example, even if the hydrocarbon resin is hydrogenated such that the hydrogenation ratio reaches 30% or more, preferably 40% or more, a reduction in weight average molecular weight can be suppressed to 12% or less, preferably 10% or less of the weight average molecular weight of the hydrocarbon resin before hydrogenation, and a reduction in softening point caused by the hydrogenation of the hydrocarbon resin can be suppressed to 5% or less of the softening point of the hydrocarbon resin before hydrogenation.

The hydrocarbon resin hydride after hydrogenation has a weight average molecular weight (Mw) in the range of preferably 1,000 to 5,000, more preferably 1,500 to 4,500, still more preferably 1,800 to 4,000. The hydrocarbon resin hydride after hydrogenation has a Z-average molecular weight (Mz) in the range of preferably 2,500 to 10,000, more preferably 2,500 to 9,000, still more preferably 3,000 to 8,000. Control of the weight average molecular weight (Mw) and the Z-average molecular weight (Mz) within the above ranges can further enhance the compatibility with a base polymer when the hydrocarbon resin hydride is used for a hot-melt adhesive composition, thus ensuring higher tackiness.

The weight average molecular weight (Mw) and the Z-average molecular weight (Mz) of the hydrocarbon resin hydride can be determined by high performance liquid chromatography as values against polystyrene standards.

The ratio (Mz/Mw) of the Z-average molecular weight of the hydrocarbon resin hydride to the weight average molecular weight thereof is in the range of preferably 1.5 to 2.5, more preferably 1.6 to 2.4, still more preferably 1.65 to 2.35.

The hydrocarbon resin hydride prepared by the production method according to the present invention has an excellent hue and a low odor. Utilizing such properties, the hydrocarbon resin hydride can be suitably used in a variety of applications such as those to hot-melt adhesives. The applications are not particularly limited.

EXAMPLES

Hereinafter, the present invention will be described in more detail by way of Examples, but these Examples should not be construed as limitations to the present invention. Hereinafter, "parts" and "%" are mass-based unless otherwise specified. Tests and evaluations were performed as described below.

A variety of measurements were performed according to the methods described below.

[Weight Average Molecular Weight]

The hydrocarbon resin before hydrogenation and the hydrocarbon resin hydride were analyzed by gel permeation chromatography to determine the weight average molecular weights (Mw) against standard polystyrenes. The gel permeation chromatography analysis was performed at 40° C. and a flow rate of 1.0 mL/min using "HLC-8320GPC" (available from Tosoh Corporation) as an analyzer, three "TSKgel SuperMultiporeHZ" columns connected (available from Tosoh Corporation), and tetrahydrofuran as a solvent.

[Softening Point (° C.)]

For the hydrocarbon resin before hydrogenation and the hydrocarbon resin hydride, the softening point (° C.) was measured according to JIS K 2207.

[Hydrogenation Ratio (%)]

For the hydrocarbon resin before hydrogenation and the hydrocarbon resin hydride, the amount of non-aromatic carbon-carbon double bonds was determined by $^1$H-NMR spectrum measurement, and the hydrogenation ratio (%) was determined based on the difference between the amount of non-aromatic carbon-carbon double bonds before hydrogenation and that of non-aromatic carbon-carbon double bonds after hydrogenation. The $^1$H-NMR spectrum measurement was performed using deuterochloroform as a solvent and an NMR measurement apparatus JMN-AL series AL400 (available from JEOL Ltd.).

[Gardner Color Scale]

A 50% by mass toluene solution of the hydrocarbon resin hydride was prepared, and the Gardner color scale of the solution was measured according to JIS K 0071-2. A smaller value in the Gardner color scale indicates a more excellent hue.

[Odor Evaluation Test]

The hydrocarbon resin hydride was subjected to a sensory test according to an olfactory measurement method for an odor, the 5th edition, issued by Japan Association on Odor Environment.

Specifically, initially, 10 g of the hydrocarbon resin hydride was famed into pieces each having a dimension of about 10 mm×5 mm×5 mm, and these pieces were placed into a 120-mL heat-resistant vessel. The vessel was covered with an aluminum foil. The heat-resistant vessel containing the hydrocarbon resin hydride was then placed into an oven, and was heated at a temperature of 150° C. for 30 minutes, followed by testing of the odor after the heating. The odor was tested by 6 panelists who were not accustomed to the odors of petroleum resins (or who were free from odors of petroleum resins in daily lives). In this test, to prevent olfactory fatigue, the 6 panelists were divided into two groups of 3 panelists, and one group smelled samples at one time. The order of smelling samples was randomized.

0: odor-free
1: odor barely recognizable (detection threshold concentration)
2: odor weak but distinctive (perceptible threshold concentration)
3: odor easy to sense
4: strong odor
5: significantly strong odor The results of the sensory test were determined by excluding the maximum value and the minimum value from the values ranked by the 6 panelists and averaging the four values. A smaller value in the sensory test is preferred.

Example 1

A mixture of 49.5 parts of cyclopentane and 12.4 parts of cyclopentene was placed into a polymerization reactor, followed by heating to 60° C. Thereafter, 0.7 parts of aluminum chloride was added to prepare a mixture A1. Subsequently, while the temperature was maintained at 60° C. over 60 minutes, the components are polymerized by continuously adding a mixture B1 of 54.1 parts of 1,3-pentadiene, 15.3 parts of isobutylene, 1.8 parts of styrene, 15.2 parts of cyclopentene, 1.2 parts of $C_4$-$C_6$ unsaturated hydrocarbon, and 9.8 parts of $C_4$-$C_6$ saturated hydrocarbon and 0.4 parts of t-butyl chloride through separate lines to the polymerization reactor containing the resulting mixture A1. Subsequently, a sodium hydroxide aqueous solution was added to the polymerization reactor to terminate the polymerization reaction. The precipitate generated after the termination of polymerization was removed by filtration to prepare a polymer solution containing a hydrocarbon resin before hydrogenation and unreacted monomers. The polymer solution was then transferred to a distillation still, and a stripping operation was performed by heating at 150° C. for 1 hour under a nitrogen atmosphere to remove the polymerization solvent and unreacted monomers. The hydrocarbon resin before hydrogenation was prepared. The weight average molecular weight and softening point of the resulting hydrocarbon resin before hydrogenation were tested and evaluated according to the methods described above. The results are shown in Table 1.

The hydrocarbon resin before hydrogenation was heated at 150° C. for 0.5 hours under reduced pressure, and the content of the volatile solvent and that of unreacted monomers were measured with a head space gas chromatograph. The results were 1000 mass ppm or less, which was the detection limit.

A hindered phenolic antioxidant (pentaerythritol tetrakis [3-(3,5-di-t-butyl-4-hydroxyphenyl)propionate], trade name "Irganox (registered trademark) 1010") as an antioxidative compound was added to the hydrocarbon resin before hydrogenation in an amount of 0.1 parts relative to 100 parts of the hydrocarbon resin before hydrogenation, and the hydrocarbon resin was heated to a temperature of 220° C. The hydrocarbon resin was hydrogenated by continuously introducing the hydrocarbon resin with hydrogen gas to a heat exchange-type multitube hydrogenation reactor while the hydrocarbon resin was kept at a temperature of 220° C. Thus, a hydrocarbon resin hydride was prepared. The hydrocarbon resin before hydrogenation when heated to a temperature of 220° C. had a melt viscosity (measured with a Thermosel-type Brookfield viscometer using a #31 rotor) of 200 mPa·s, and the hydrogen pressure during hydrogenation was 2 MPa as the absolute pressure. In the heat exchange-type multitube hydrogenation reactor used (inner diameter of reaction tubes: 25 mm, length of reaction tubes: 3 m, the number of reaction tubes: 1700 tubes), the reaction tubes were filled with a nickel-bearing silica magnesia catalyst (trade name "N102F", available from JGC Catalysts and Chemicals Ltd., a cylindrical shape having an average diameter of 2.8 mmϕ and an average length of 2.8 mm), the residence time in the reaction tubes was 1.5 hours, and the number of passings of the hydrocarbon resin was one time.

In the next step, the resulting hydrocarbon resin hydride was melted by heating to 250° C. A saturated steam was blown thereinto, and low molecular weight oligomer components were distilled off to prepare a hydrocarbon resin hydride according to Example 1. The hydrocarbon resin hydride was tested and evaluated according to the methods above for the hydrogenation ratio, the weight average molecular weight, the softening point, the Gardner color scale, and the odor evaluation. The results are shown in Table 1.

Example 2

Using a hydrocarbon resin before hydrogenation prepared in the same manner as in Example 1, a hydrocarbon resin hydride was prepared in the same manner as in Example 1 except that the temperature of the hydrocarbon resin when introduced with hydrogen gas to the heat exchange-type multitube hydrogenation reactor was changed from 220° C. to 320° C., and the hydrocarbon resin was hydrogenated by continuously introducing the hydrocarbon resin while the temperature thereof was kept at 320° C. In Example 2, the residence time in the reaction tubes was 0.2 hours, and the number of passings of the hydrocarbon resin was one time. The hydrocarbon resin before hydrogenation when heated to a temperature of 320° C. had a melt viscosity (measured with a Thermosel-type Brookfield viscometer using a #31 rotor) of 120 mPa·s. The resulting hydrocarbon resin hydride was evaluated in the same manner as in Example 1. The results are shown in Table 1.

Example 3

A hydrocarbon resin hydride was prepared in the same manner as in Example 1 except that the amount of the hindered phenolic antioxidant added in Example 1 was changed to 0.3 parts relative to 100 parts of the hydrocarbon resin before hydrogenation. In Example 3, the residence time in the reaction tubes was 1.5 hours, and the number of passings of the hydrocarbon resin was one time. The resulting hydrocarbon resin hydride was evaluated in the same manner as in Example 1. The results are shown in Table 1.

Example 4

A hydrocarbon resin hydride was prepared in the same manner as in Example 2 except that the amount of the hindered phenolic antioxidant added in Example 2 was changed to 0.3 parts relative to 100 parts of the hydrocarbon resin before hydrogenation. In Example 4, the residence time in the reaction tubes was 0.2 hours, and the number of passings of the hydrocarbon resin was one time. The resulting hydrocarbon resin hydride was evaluated in the same manner as in Example 1. The results are shown in Table 1.

Example 5

A hydrocarbon resin hydride was prepared in the same manner as in Example 1 except that the hindered phenolic antioxidant as the antioxidative compound in Example 1 was changed to an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), and the antioxidant having a 2,2,6,6-tetraalkyl-4-piperidyl group was added in an amount of 0.3 parts relative to 100 parts of the hydrocarbon resin before hydrogenation. In Example 5, the residence time in the reaction tubes was 1.5 hours, and the number of passings of the hydrocarbon resin was one time. The resulting hydrocarbon resin hydride was evaluated in the same manner as in Example 1. The results are shown in Table 1.

Example 6

A hydrocarbon resin hydride was prepared in the same manner as in Example 2 except that the hindered phenolic antioxidant as the antioxidative compound in Example 2 was changed to an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), and the antioxidant having a 2,2,6,6-tetraalkyl-4-piperidyl group was added in an amount of 0.3 parts relative to 100 parts of the hydrocarbon resin before hydrogenation. In Example 6, the residence time in the reaction tubes was 0.2 hours, and the number of passings of the hydrocarbon resin was one time. The resulting hydrocarbon resin hydride was evaluated in the same manner as in Example 1. The results are shown in Table 1.

Example 7

A hydrocarbon resin hydride was prepared in the same manner as in Example 1 except that the hindered phenolic antioxidant as the antioxidative compound in Example 1 was used in combination with an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), the hindered phenolic antioxidant was added in an amount of 0.2 parts relative to 100 parts of the hydrocarbon resin before hydrogenation, and the antioxidant having a 2,2,6,6-tetraalkyl-4-piperidyl group was added in an amount of 0.1 parts relative to 100 parts of the hydrocarbon resin before hydrogenation. In Example 7, the residence time in the reaction tubes was 1.5 hours, and the number of passings of the hydrocarbon resin was one time. The resulting hydrocarbon resin hydride was evaluated in the same manner as in Example 1. The results are shown in Table 1.

Example 8

A hydrocarbon resin hydride was prepared in the same manner as in Example 2 except that the hindered phenolic antioxidant as the antioxidative compound in Example 2 was used in combination with an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), the hindered phenolic antioxidant was added in an amount of 0.2 parts relative to 100 parts of the hydrocarbon resin before hydrogenation, and the antioxidant having a 2,2,6,6-tetraalkyl-4-piperidyl group was added in an amount of 0.1 parts relative to 100 parts of the hydrocarbon resin before hydrogenation. In Example 8, the residence time in the reaction tubes was 0.2 hours, and the number of passings of the hydrocarbon resin was one time. The resulting hydrocarbon resin hydride was evaluated in the same manner as in Example 1. The results are shown in Table 1.

Comparative Example 1

A hydrocarbon resin before hydrogenation prepared in the same manner as in Example 1 was heated to a temperature of 220° C. in the absence of the hindered phenolic antioxidant, and the hydrocarbon resin was hydrogenated by continuously introducing the hydrocarbon resin and hydrogen gas to a heat exchange-type multitube hydrogenation reactor while the hydrocarbon resin was kept at a temperature of 220° C. Thus, a hydrocarbon resin hydride was prepared. The hydrocarbon resin before hydrogenation when heated to a temperature of 220° C. had a melt viscosity (measured with a Thermosel-type Brookfield viscometer using a #31 rotor) of 200 mPa·s, and the hydrogen pressure during hydrogenation was 2 MPa as the absolute pressure. In the heat exchange-type multitube hydrogenation reactor used (inner diameter of reaction tubes: 25 mm, length of reaction tubes: 3 m, the number of reaction tubes: 1700 tubes), the reaction tubes were filled with a nickel-bearing silica magnesia catalyst (trade name "N102F"), available from JGC Catalysts and Chemicals Ltd., a cylindrical shape having an average diameter of 2.8 mmϕ and an average length of 2.8 mm), the residence time in the reaction tubes was 1.5 hours, and the number of passings of the hydrocarbon resin was one time.

In the next step, a hindered phenolic antioxidant (pentaerythritol tetrakis[3-(3,5-di-t-butyl-4-hydroxyphenyl)propionate], trade name "Irganox (registered trademark) 1010") was added to the resulting hydrocarbon resin hydride in an amount of 0.3 parts relative to 100 parts of the hydrocarbon resin before hydrogenation. The hydrocarbon resin hydride was melted by heating to 250° C. A saturated steam was blown thereinto, and low molecular weight oligomer components were distilled off to prepare a hydrocarbon resin hydride according to Comparative Example 1. The resulting hydrocarbon resin hydride was evaluated in the same manner as in Example 1. The results are shown in Table 1.

Comparative Example 2

Using a hydrocarbon resin before hydrogenation prepared in the same manner as in Example 1, a hydrocarbon resin hydride was prepared in the same manner as in Comparative Example 1 except that the temperature of the hydrocarbon resin when introduced with hydrogen gas to a heat exchange-type multitube hydrogenation reactor was changed from 220° C. to 320° C., and the hydrocarbon resin was hydrogenated by continuously introducing the hydrocarbon resin while the temperature thereof was kept at 320° C. In Comparative Example 2, the residence time in the reaction tubes was 0.2 hours, and the number of passings of the hydrocarbon resin was one time. The resulting hydrocarbon resin hydride was evaluated in the same manner as in Example 1. The results are shown in Table 1.

Comparative Example 3

A hydrocarbon resin hydride was prepared in the same manner as in Comparative Example 1 except that the hindered phenolic antioxidant as the antioxidative compound in Comparative Example 1 was used in combination with an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), the hindered phenolic antioxidant was added in an amount of 0.2 parts relative to 100 parts of the hydrocarbon resin before hydrogenation, and the antioxidant having a 2,2,6,6-tetraalkyl-4-piperidyl group was added in an amount of 0.1 parts relative to 100 parts of the hydrocarbon resin before hydrogenation. In Comparative Example 3, residence time in the reaction tubes was 1.5 hours, and the number of passings of the hydrocarbon resin was one time. The resulting hydrocarbon resin hydride was evaluated in the same manner as in Example 1. The results are shown in Table 1.

Comparative Example 4

A hydrocarbon resin hydride was prepared in the same manner as in Comparative Example 2 except that the hindered phenolic antioxidant as the antioxidative compound in Comparative Example 2 was used in combination with an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), the hindered phenolic antioxidant was added in an amount of 0.2 parts relative to 100 parts of the hydrocarbon resin before hydrogenation, and the antioxidant having a 2,2,6,6-tetraalkyl-4-piperidyl group was added in an amount of 0.1 parts relative to 100 parts of the hydrocarbon resin before hydrogenation. In Comparative Example 4, the residence time in the reaction tubes was 0.2 hours, and the number of passings of the hydrocarbon resin was one time. The resulting hydrocarbon resin hydride was evaluated in the same manner as in Example 1. The results are shown in Table 1.

TABLE 1

|  | Example 1 | Example 2 | Example 3 | Example 4 | Example 5 | Example 6 | Example 7 |
|---|---|---|---|---|---|---|---|
| Evaluation of hydrocarbon resin | | | | | | | |
| Weight average molecular weight | 3020 | 3020 | 3020 | 3020 | 3020 | 3020 | 3020 |
| Softening point ° C. | 100 | 100 | 100 | 100 | 100 | 100 | 100 |
| Hydrogenation | | | | | | | |
| Hydrocarbon resin parts | 100 | 100 | 100 | 100 | 100 | 100 | 100 |
| Irganox (registered trademark) 1010 parts | 0.1 | 0.1 | 0.3 | 0.3 | 0 | 0 | 0.2 |
| Chimassorb (registered trademark) 2020 parts | 0 | 0 | 0 | 0 | 0.3 | 0.3 | 0.1 |
| Temperature of hydrocarbon resin ° C. | 220 | 320 | 220 | 320 | 220 | 320 | 220 |
| Melt viscosity of hydrocarbon resin mPa · s | 200 | 120 | 200 | 120 | 200 | 120 | 200 |
| Hydrogen pressure mPa · s | 2 | 2 | 2 | 2 | 2 | 2 | 2 |

TABLE 1-continued

| | After hydrogenation | | | | | | |
|---|---|---|---|---|---|---|---|
| Irganox (registered trademark) 1010 parts | 0 | 0 | 0 | 0 | 0 | 0 | 0 |
| Chimassorb (registered trademark) 2020 parts | 0 | 0 | 0 | 0 | 0 | 0 | 0 |
| | Evaluation of hydrocarbon resin hydride | | | | | | |
| Hydrogenation ratio % | 40 | 55 | 40 | 55 | 40 | 55 | 40 |
| Weight average molecular weight | 2860 | 2740 | 2920 | 2800 | 2790 | 2680 | 2900 |
| Softening point ° C. | 97 | 95 | 98 | 96 | 96 | 95 | 98 |
| Gardner color scale | 0.1 | 0.1 | 0.1 | 0.1 | 0.1 | 0.1 | 0.1 |
| Strength of odor (6 ranks) | 2.0 | 2.5 | 2.0 | 2.0 | 2.0 | 2.0 | 1.5 |

| | Example 8 | Comp. Example 1 | Comp. Example 2 | Comp. Example 3 | Comp. Example 4 |
|---|---|---|---|---|---|
| | Evaluation of hydrocarbon resin | | | | |
| Weight average molecular weight | 3020 | 3020 | 3020 | 3020 | 3020 |
| Softening point ° C. | 100 | 100 | 100 | 100 | 100 |
| | Hydrogenation | | | | |
| Hydrocarbon resin parts | 100 | 100 | 100 | 100 | 100 |
| Irganox (registered trademark) 1010 parts | 0.2 | 0 | 0 | 0 | 0 |
| Chimassorb (registered trademark) 2020 parts | 0.1 | 0 | 0 | 0 | 0 |
| Temperature of hydrocarbon resin ° C. | 320 | 220 | 320 | 220 | 320 |
| Melt viscosity of hydrocarbon resin mPa · s | 120 | 200 | 120 | 200 | 120 |
| Hydrogen pressure mPa · s | 2 | 2 | 2 | 2 | 2 |
| | After hydrogenation | | | | |
| Irganox (registered trademark) 1010 parts | 0 | 0.3 | 0.3 | 0.2 | 0.2 |
| Chimassorb (registered trademark) 2020 parts | 0 | 0 | 0 | 0.1 | 0.1 |
| | Evaluation of hydrocarbon resin hydride | | | | |
| Hydrogenation ratio % | 55 | 40 | 55 | 40 | 55 |
| Weight average molecular weight | 2760 | 2680 | 2500 | 2680 | 2500 |
| Softening point ° C. | 96 | 94 | 91 | 94 | 91 |
| Gardner color scale | 0.1 | 0.1 | 0.1 | 0.1 | 0.1 |
| Strength of odor (6 ranks) | 1.5 | 2.5 | 3.0 | 2.0 | 2.5 |

Table 1 shows that changes in molecular weight and softening point caused by hydrogenation of the hydrocarbon resin were suppressed by hydrogenating the hydrocarbon resin by bringing the hydrocarbon resin into contact with hydrogen in the presence of the antioxidative compound and the hydrogenation catalyst, the antioxidative compound being at least one selected from the group consisting of hindered phenolic antioxidants and antioxidants having a 2,2,6,6-tetraalkyl-4-piperidyl group. Furthermore, the resulting hydrocarbon resin hydrides had an excellent hue (Gardner color scale) and a low odor (Examples 1 to 8).

In contrast, in the cases where the hydrocarbon was hydrogenated by bringing the hydrocarbon resin into contact with hydrogen in the presence of the hydrogenation catalyst but not the antioxidative compound, the molecular weight and the softening point were more significantly changed before and after hydrogenation compared to the cases where hydrogenation was allowed to proceed to the same hydrogenation ratio by bringing the hydrocarbon resin into contact with hydrogen in the presence of the antioxidative compound and the hydrogenation catalyst, and changes in molecular weight and softening point caused by hydrogenation of the hydrocarbon resin were not suppressed (Comparative Examples 1 to 4).

Example 9

Using a hydrocarbon resin prepared in the same manner as in Example 1, a hydrocarbon resin hydride was prepared in the same manner as in Example 1 except that the temperature of the hydrocarbon resin when introduced with hydrogen gas to the heat exchange-type multitube hydrogenation reactor was changed from 220° C. to 160° C., and the hydrocarbon resin was hydrogenated by continuously introducing the hydrocarbon resin while the temperature thereof was kept at 160° C. In Example 9, the residence time in the reaction tubes was 0.8 hours, and the number of passings of the hydrocarbon resin was one time. The hydrocarbon resin before hydrogenation when heated to a temperature of 160° C. had a melt viscosity (measured with a Thermosel-type Brookfield viscometer using a #31 rotor) of 1200 mPa·s. The resulting hydrocarbon resin hydride was evaluated in the same manner as in Example 1. The results are shown in Table 2.

Example 10

Using a hydrocarbon resin prepared in the same manner as in Example 1, a hydrocarbon resin hydride was prepared in the same manner as in Example 1 except that the hindered phenolic antioxidant was added in an amount of 0.3 parts relative to 100 parts of the hydrocarbon resin before hydrogenation, the temperature of the hydrocarbon resin when introduced with hydrogen gas to the heat exchange-type multitube hydrogenation reactor was changed from 220° C. to 160° C., and the hydrocarbon resin was hydrogenated by continuously introducing the hydrocarbon resin while the temperature thereof was kept at 160° C. In Example 10, the residence time in the reaction tubes was 0.8 hours, and the number of passings of the hydrocarbon resin was one time. The resulting hydrocarbon resin hydride was evaluated in the same manner as in Example 1. The results are shown in Table 2.

Example 11

A hydrocarbon resin hydride was prepared in the same manner as in Example 9 except that the hindered phenolic antioxidant as the antioxidative compound in Example 9 was changed to an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), and the antioxidant having a 2,2,6,6-tetraalkyl-4-piperidyl group was added in an amount of 0.3 parts relative to 100 parts of the hydrocarbon resin before hydrogenation. In Example 11, the residence time in the reaction tubes was 0.8 hours, and the number of passings of the hydrocarbon resin was one time. The resulting hydrocarbon resin hydride was evaluated in the same manner as in Example 1. The results are shown in Table 2.

Example 12

A hydrocarbon resin hydride was prepared in the same manner as in Example 9 except that the hindered phenolic antioxidant as the antioxidative compound in Example 9 was used in combination with an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), and the hindered phenolic antioxidant was added in an amount of 0.2 parts relative to 100 parts of the hydrocarbon resin before hydrogenation, and the antioxidant having a 2,2,6,6-tetraalkyl-4-piperidyl group was added in an amount of 0.1 parts relative to 100 parts of the hydrocarbon resin before hydrogenation. In Example 12, the residence time in the reaction tubes was 0.8 hours, and the number of passings of the hydrocarbon resin was one time. The resulting hydrocarbon resin hydride was evaluated in the same manner as in Example 1. The results are shown in Table 2.

Comparative Example 5

Using a hydrocarbon resin prepared in the same manner as in Example 1, a hydrocarbon resin hydride was prepared in the same manner as in Comparative Example 1 except that the temperature of the hydrocarbon resin when introduced with hydrogen gas to the heat exchange-type multitube hydrogenation reactor was changed from 220° C. to 160° C., and the hydrocarbon resin was hydrogenated by continuously introducing the hydrocarbon resin while the temperature thereof was kept at 160° C. In Comparative Example 3, the residence time in the reaction tubes was 0.8 hours, and the number of passings of the hydrocarbon resin was one time. The resulting hydrocarbon resin hydride was evaluated in the same manner as in Example 1. The results are shown in Table 2.

Comparative Example 6

A hydrocarbon resin hydride was prepared in the same manner as in Comparative Example 5 except that the hindered phenolic antioxidant as the antioxidative compound in Comparative Example 5 was used in combination with an antioxidant having a 2,2,6,6-tetraalkyl-4-piperidyl group (poly[{(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], trade name "Chimassorb (registered trademark) 2020"), the hindered phenolic antioxidant was added in an amount of 0.2 parts relative to 100 parts of the hydrocarbon resin before hydrogenation, and the antioxidant having a 2,2,6,6-tetraalkyl-4-piperidyl group was added in an amount of 0.1 parts relative to 100 parts of the hydrocarbon resin before hydrogenation. In Comparative Example 6, the residence time in the reaction tubes was 0.8 hours, and the number of passings of the hydrocarbon resin was one time. The resulting hydrocarbon resin hydride was evaluated in the same manner as in Example 1. The results are shown in Table 2.

TABLE 2

|  | Example 9 | Example 10 | Example 11 | Example 12 | Comp. Example 5 | Comp. Example 6 |
|---|---|---|---|---|---|---|
| Evaluation of hydrocarbon resin | | | | | | |
| Weight average molecular weight | 3020 | 3020 | 3020 | 3020 | 3020 | 3020 |
| Softening point ° C. | 100 | 100 | 100 | 100 | 100 | 100 |
| Hydrogenation | | | | | | |
| Hydrocarbon resin parts | 100 | 100 | 100 | 100 | 100 | 100 |
| Irganox (registered trademark) 1010 parts | 0.1 | 0.3 | 0 | 0.2 | 0 | 0 |
| Chimassorb (registered trademark) 2020 parts | 0 | 0 | 0.3 | 0.1 | 0 | 0 |
| Temperature of hydrocarbon resin ° C. | 160 | 160 | 160 | 160 | 160 | 160 |
| Melt viscosity of hydrocarbon resin mPa · s | 1200 | 1200 | 1200 | 1200 | 1200 | 1200 |
| Hydrogen pressure mPa · s | 2 | 2 | 2 | 2 | 2 | 2 |
| After hydrogenation | | | | | | |
| Irganox (registered trademark) 1010 parts | 0 | 0 | 0 | 0 | 0.3 | 0.2 |
| Chimassorb (registered trademark) 2020 parts | 0 | 0 | 0 | 0 | 0 | 0.1 |
| Evaluation of hydrocarbon resin hydride | | | | | | |
| Hydrogenation ratio % | 3 | 3 | 3 | 3 | 3 | 3 |
| Weight average molecular weight | 2920 | 2980 | 2940 | 2980 | 2800 | 2800 |
| Softening point ° C. | 98 | 99 | 98 | 99 | 96 | 96 |
| Gardner color scale | 1 | 1 | 1 | 1 | 1 | 1 |
| Strength of odor (6 ranks) | 3.5 | 3.5 | 3.0 | 2.5 | 3.5 | 2.5 |

The resulting hydrocarbon resin hydride was evaluated in the same manner as in Example 1. The results are shown in Table 2.

Table 2 shows that even at a low hydrogenation ratio, hydrocarbon resin hydrides having an excellent hue and a low odor were produced while changes in molecular weight and softening point caused by hydrogenation of the hydrocarbon resin were suppressed (Examples 9 to 12) by hydrogenating the hydrocarbon resin by bringing the hydrocarbon resin into contact with hydrogen in the presence of the antioxidative compound and the hydrogenation catalyst, the antioxidative compound being at least one selected from the group consisting of hindered phenolic antioxidants and antioxidants having a 2,2,6,6-tetraalkyl-4-piperidyl group.

In contrast, in the cases where the hydrocarbon resin was hydrogenated by bringing the hydrocarbon resin into contact with hydrogen in the presence of the hydrogenation catalyst but not the antioxidative compound, changes in molecular weight and softening point caused by hydrogenation of the hydrocarbon resin were not suppressed. (Comparative Examples 5 and 6).

The invention claimed is:

1. A method for producing a hydrocarbon resin hydride, comprising:
   hydrogenating a hydrocarbon resin by bringing the hydrocarbon resin into contact with hydrogen in the presence of an antioxidative compound and a hydrogenation catalyst, the antioxidative compound being at least one selected from the group consisting of hindered phenolic antioxidants and antioxidants having a 2,2,6,6-tetraalkyl-4-piperidyl group,
   wherein the hydrocarbon resin is prepared by cationic polymerization of a monomer mixture containing an unsaturated hydrocarbon in the presence of a Lewis acid catalyst.

2. The method for producing a hydrocarbon resin hydride according to claim 1, wherein the amount of the antioxidative compound is 0.01 to 10 parts by mass relative to 100 parts by mass of the hydrocarbon resin.

3. The method for producing a hydrocarbon resin hydride according to claim 1, wherein the hydrocarbon resin is prepared through a stripping treatment on a polymer solution containing the hydrocarbon resin, the polymer solution being prepared by cationic polymerization in the presence of a Lewis acid catalyst.

4. The method for producing a hydrocarbon resin hydride according to claim 1, wherein the hydrogenating is performed by bringing the hydrocarbon resin into contact with hydrogen while the hydrocarbon resin is heated to 150 to 350° C. and is controlled to maintain a melt viscosity in the range of 50 to 1500 mPa.

5. The method for producing a hydrocarbon resin hydride according to claim 1, wherein the hydrogenating is performed at a hydrogen pressure controlled in the range of 0.5 to 3.0 MPa.

6. The method for producing a hydrocarbon resin hydride according to claim 1, wherein the hydrogenating is performed by bringing the hydrocarbon resin into contact with hydrogen using a fixed bed reactor.

7. The method for producing a hydrocarbon resin hydride according to claim 1, wherein the hydrogenation catalyst is in a granular form having an average diameter of 1 to 5 mmø and an average length of 1 to 10 mm.

8. The method for producing a hydrocarbon resin hydride according to claim 1, wherein the hydrogenation catalyst is a nickel catalyst.

9. The method for producing a hydrocarbon resin hydride according to claim 8, wherein the nickel catalyst is a catalyst mainly composed of magnesia-silica bearing nickel.

* * * * *